United States Patent [19]

Schiffman

[11] 4,341,564

[45] Jul. 27, 1982

[54] CORROSION INHIBITIVE PIGMENT

[76] Inventor: Louis Schiffman, 1837 Merritt Rd., Abington, Pa. 19001

[21] Appl. No.: 210,556

[22] Filed: Nov. 26, 1980

[51] Int. Cl.³ .......................... C04B 31/28; C09C 1/34
[52] U.S. Cl. ................................ 106/302; 106/14.21; 148/6.2
[58] Field of Search ............................ 106/302, 14.21; 148/6.16, 6.2

[56] References Cited

U.S. PATENT DOCUMENTS

| | | | |
|---|---|---|---|
| 2,156,451 | 5/1939 | Grasshoff et al. | 106/302 |
| 3,189,488 | 6/1965 | Schiffman | 148/6.16 |
| 3,189,489 | 6/1965 | Schiffman | 148/6.16 |
| 4,161,409 | 7/1979 | Schiffman | 106/302 X |
| 4,183,772 | 1/1980 | Davis | 148/6.16 |

*Primary Examiner*—Carl F. Dees
*Attorney, Agent, or Firm*—B. Max Klevit

[57] ABSTRACT

Corrosion inhibiting pigments are obtained by partial reduction of a hexavalent chromium compound in aqueous solution obtaining a reaction product containing 5 to 95% of the chromium in lower valent state. In the aqueous reaction mixture there is incorporated a water-soluble or water-dispersible polymeric material capable of reacting with chromate to form an insoluble product therewith and the obtained mixture evaporated to dryness under controlled conditions, followed by subdividing the obtained dry mass to suitable size.

15 Claims, No Drawings

CORROSION INHIBITIVE PIGMENT

The present invention relates generally to the field of corrosion inhibiting pigments based on compounds of chromium.

BACKGROUND OF PRIOR ART

The protection of metal surfaces against corrosion by the application thereto of coatings containing lead or chromium pigments has been described in the patent art and in technical publications and certain of such coatings have, to some extent, been employed industrially.

Moreover, chromic acid and its salts are well recognized to be effective corrosion inhibiting agents for application to metallic surfaces such as iron, steel, zinc, aluminum, copper and alloys of these. Thus, in an earlier patent of the present inventor, U.S. Pat. No. 3,063,877, there is described the protective treatment of metal surfaces, particularly such surfaces having thereon a previously applied conversion coating, by applying to said surface an aqueous solution containing chromium compounds, designated "mixed chromium compounds", including hexavalent and lower valent chromium compounds or complexes, obtained by partial reduction of hexavalent chromium.

In a later patent of the present inventor, U.S. Pat. No. 4,161,409 chromium compositions obtained by partial reduction of hexavalent chromium, are converted to pigment form by evaporating the aqueous reaction product of such reduction to dryness and pulverizing the dried product. Such pigments, with or without extenders, incorporated in conventional vehicles serve as corrosion inhibitors in metal coating compositions.

Another approach to the treatment of metal surfaces to improve corrosion resistance and to prepare such surfaces to receive a siccative finish, is disclosed in U.S. Pat. Nos. 3,185,596; 3,189,488 and 3,189,489 issued to the present inventor. As disclosed in these patents, coatings on metal surfaces having improved flexibility, good paint adhesion, and impact and corrosion resistance are obtained when the applied coating comprises an aqueous solution of mixed chromium compounds (such as that obtained by partial reduction of hexavalent chromium) to which there is added certain water soluble polymers. Among the polymers disclosed in these patents are included: water-soluble and water-dispersible polyacrylic acid compounds, water soluble polymers of hydroxyethyl ethers of cellulose and polyvinyl alcohols.

Recently issued U.S. Pat. No. 4,183,772 of J. W. Davis, assigned to Union Carbide Corporation, refers to said U.S. Pat. No. 3,185,596 of the present inventor as one of the most satisfactory of the "no waste" pretreatments for application to metals for improving corrosion resistance and preparation of the metal surface to receive a siccative finish. The Davis patent describes a modification of the cited U.S. Pat. No. 3,185,596, and involves the use of solutions comprising hexavalent and trivalent chromium in association with polyacrylic acid, phosphoric acid and water dispersible acrylic emulsion polymer. This mixture is stated by patentee to extend the utility of pretreating compositions of the cited '596 patent for application to an extended variety of paint systems and paint types.

SUMMARY OF THE INVENTION

It has now been found that improved corrosion-inhibiting pigments are obtained by initially reducing a hexavalent chromium compound in aqueous solution to form a reaction mixture containing hexavalent and lower valent chromium, incorporating into the aqueous reaction mixture a resinous or polymeric material capable of reacting with chromium compounds, and evaporating the mixture to dryness for subsequent pigment formation.

Without being bound to any particular theory to account for the improved properties of the pigments obtained in accordance with the present invention, it is believed that by reaction of the included polymeric material with reactable chromium prior to completion of drying of the aqueous mixture, a reaction product or complex is formed, resulting in diminished tendency to leaching of chromium from the ultimate pigment, when exposed to aqueous systems.

While it has been theorized that the presence of hexavalent (soluble) chromium on the metal surface accounts in large measure for the protection of the metal against corrosion, an important consideration is the rate of solution or controlled "leaching", particularly in water borne coating systems where "wash out" should be avoided. Thus, if the rate of leaching of chromium is too high, the exposure of the painted or coated surface to water and humidity may result in undesirable blister formation. By controlling the rate of degree of leaching, the effectiveness of the protective coating can be significantly extended, particularly with regard to exposure to aqueous systems.

DETAILED DESCRIPTION

In producing the initial aqueous reaction product containing hexavalent chromium and lower valent chromium, the methods and reactants disclosed in my prior patents above cited may generally be employed. Thus, the starting hexavalent chromium compound may be chromic acid as previously disclosed or one may employ other soluble hexavalent chromium compounds such as chromates or dichromates of ammonium, alkali metal, or magnesium. While the preferred reducing agent is a water soluble organic compound containing an active hydroxyl, aldehyde or carbonyl group, the present invention is not limited to these. Among the reducing agents that can be employed, besides the previously disclosed formaldehyde, methanol, ethanol, citric acid, sucrose, furfural, etc.; there are also included inorganic reducing agents such as hydrogen peroxide and potassium iodide. In fact, the partial reduction of hexavalent chromium compounds can be effected with a wide range of reducing agents which, in addition to those already mentioned, would include straight chain polyalcohols in general, glycols, other sugars such as glucose and other monoses, combinations of two or more of the named reducing agents may be employed, if desired. Because of proven effectiveness and relatively low cost, the preferred reductants are: formaldehyde, methanol, sucrose and furfural.

In effecting the initial reduction, the concentration of the chromic ($Cr^{VI}$) solution and the mole ratios of the reactants have an important bearing on the extent to which the hexavalent chromium is reduced. In general, the higher the mole ratio of reductant to the chromic compound, the higher will be the percentage of reduction. The extent of reduction increases initially with increasing chromic concentration up to a certain point, then diminishes with higher chromic concentration, other factors being equal.

It has been further found that the extent of reduction of the hexavalent chromium is not only a function of the concentration of reactants but is also dependent upon the specific reducing agent employed. For example, in the reaction of 25% (by weight) aqueous solution of chromic acid with such reductants as formaldehyde, methanol, furfural, citric acid and hydrogen peroxide, the extent of reduction varies in the range from about 12% to 75%. It is also to be noted that the rates of reaction between the chromic acid solution and the reducing agent may vary depending upon reaction conditions, including the dosage and concentration of the reactants. In some cases, for example, the addition of the reductant to the chromic acid solution results in almost instantaneous reaction, while in other instances, an induction period is had until the initiation of reaction becomes visibly apparent by evolution of gas and darkening of the solution. Nevertheless, good corrosion inhibitive properties are obtained by the pigments formed in accordance with the present invention employing the various products of partial reduction of hexavalent chromium over a broad range in the ratio of hexavalent to reduced chromium.

It was found that corrosion protection is obtained even with as much as 95% of the total chromium being present in reduced state. The most beneficial protective properties however are provided when the reduction is in the range of 25-75%. The presence of hexavalent chromium in combination with lower valent chromium, is an essential requirement in providing the desired corrosion protection, in forming the improved pigments of the present invention, as was the case with the aqueous metal treating solutions of prior U.S. Pat. No. 3,063,877 and the pigments produced in accordance with my prior U.S. Pat. No. 4,161,409. The proportion of reducing agent to chromic compound should therefore be less than that which would cause complete reduction of all the hexavalent chromium.

For practical purposes, in the production of the novel pigments of the present invention, it has been found desirable to employ a 20-50% by weight aqueous solution of chromic acid (or other hexavalent chromium compound) and react it with a reductant of the type above described in the ratio of less than one mole of the reductant per mole of the chromic acid. Under these conditions there is obtained a solution of partially reduced chromate. To this solution there is added the resinous or polymeric constituent, or a monomeric constituent, which on subsequent heating and drying provides a film coating or barrier on the subsequently produced pigment, imparting thereto a reduced rate of chromate leaching in aqueous systems. The terms "rate of leaching" or "rate of release" are employed herein to differentiate over the term "solubility", the latter term defining an attained equilibrium state rather than a rate of solution. Any of a wide range of resinous polymeric materials or monomers forming resinous polymers may be utilized in practice of the present invention, for admixture in the partially reduced chromium composition. Preferably these film-forming materials should be soluble or dispersible in the aqueous solution of the mixed chromium compounds. Among the acrylic polymers that can be thus employed, there are commercially available those products marketed under proprietary designations Acrysols and Rhoplex (Rohm & Haas Company), being respectively water soluble solutions of polyacrylic acids and water-dispersible emulsions of polyacrylic acids. Among the polyvinyl alcohol compounds that can be employed, are those having viscosities ranging from 4 to 65 cps (4% aqueous solution at 20° C.) and having degrees of hydrolysis ranging from as low as 60-65% to essentially complete hydrolysis. These are available commercially at various viscosity ranges, typical examples of which are sold under the trade name of Elvanol (E. I. du Pont Co.), Vinol (Air Products and Chemicals) and Gelvatol (Monsanto Chem. Co.). Hydroxyalkyl ethers of cellulose are available commercially as Natrosols (Hercules Co.) and Cellosize (Union Carbide Co.), in several viscosity grades ranging from less than 100 cps. to several thousand cps. (Brookfield viscosity at 25° C. for 1% solution). Other polymeric materials that can be employed include: polyvinyl pyrrolidones, polyacrylic esters, polyacrylamides, alkylamino acrylates and methacrylates.

As little as 0.01 part by weight of polymeric constituent per unit weight of chromium compound (calculated as $CrO_3$) will produce a pigment having some extended improved properties particularly as regards diminished leach-ability of chromates and decreased sensitivity of the painted or coated surface to water soak exposure. Better results are obtained when the amount of polymer is at least 0.025 parts by weight of the chromate. The maximum amount of polymeric material to be added should, however, be less than the amount that would cause complete reduction of the contained hexavalent chromium to lower valent state through possible interactions therewith and the subsequent heating steps employed in pigment production. Desirably the amount of polymer added to the obtained mixture of hexavalent and lower valent chromium compounds should be such as not to significantly alter the hexavalent to lower valent chrome ratio, or such that any subsequent reaction that might occur between polymer and chromium compound will produce a composition containing hexavalent to lower valent chromium falling within the preferred limits of 25 to 75% reduced chromium. The addition of such disproportionate amounts of polymer as to cause gelling or precipitation is best avoided.

In accordance with an embodiment of the invention there is slowly added to a 25 weight percent aqueous solution of chromic acid, with vigorous stirring in aqueous solution of reductant in the ratio of one mole of the reductant to three moles of chromic acid. The reaction is highly exothermic and slow addition of the reductant with vigorous stirring is desirable during the entire period of addition to permit close control of temperature and reaction rate. It is generally best to operate so that the temperature is kept below 95° C. and preferably below 85° C.

When addition of reductant is completed, stirring is continued until no further reaction is evident (by cessation of gas evolution). The obtained reaction product when using as the reductant, formaldehyde (37% solution), methanol, hydrogen peroxide, furfural or citric acid, will contain from 12 to 75% of the original chromic acid in the reduced state, accordingly leaving 25 to 88% of the chromium in hexavalent state. While pigments obtained by drying this type of reaction product exhibit corrosion inhibiting properties when applied to metal surfaces in conventional vehicles, extended and improved properties are obtained, particularly with regard to water sensitivity, by incorporation of the resinous or polymeric materials in accordance with the present invention, as will hereinafter appear.

To the reaction product containing hexavalent and lower valent chromium described above, there is added at least 0.01 parts by weight of one of the polymeric materials described above (by weight of $CrO_3$ present), preferably at least 0.025 parts, and thoroughly admixed therewith. The obtained mixture is transferred to evaporating trays and dried at elevated temperature, after which the dried product is ground to pigment particle size in a ball, pebble, buhrstone, mikropulverizer or other conventional type of pigment grinding mill. In general, the pigment product should be ground to a pigment particle size preferably below 5 microns and such that the "agglomerates" major portion passes through a #325 standard sieve (preferably about maximum 1% retained).

The ground pigment product thus formed in accordance with the invention comprises discrete particles of hexavalent chrome in partially reduced state, encapsulated or enveloped in the associated polymeric film. While it is preferred to admix the polymeric film-forming material as such with the reduced hexavalent chromium product (containing hexavalent and lower valent chromium compound), it is also possible instead to employ a polymerizable monomer which on subsequent treatment or exposure to appropriate conditions is polymerized to a film-forming product.

While drying temperatures below 150° C. are generally preferred, higher temperatures of drying may be employed and in some instances have proved beneficial. During the drying step, apparently some sort of reaction takes place between the chromate and the polymeric or monomeric additive, forming a resinous film or barrier which reduces the rate at which the chromate can be leached from the ultimate dry pigment by water exposure, particularly when such pigments are applied to a metal surface in an aqueous coating composition. The extent of drying, as to time and temperature of exposure of the mixture to produce the pigment influences the rate of leachability of chromate from the obtained pigment. Generally, other factors being equal, the higher the drying temperature and the longer the period of heat treatment, the lower the leaching rate of chromate in aqueous systems. However, drying temperatures about 450° F. (232° C.) and particularly above 500° F. (260° C.) should be avoided, since at these higher temperatures the pigment appears to be adversely affected with respect to corrosion inhibiting properties.

Pigment prepared in accordance with the invention may be incorporated in primer coating compositions applied to metal surfaces to protect the same against corrosion. The novel pigments of the invention may be used in various water borne systems such as aqueous emulsion paints and coating compositions, in wash primer formulations, and in various organic-based coating systems including those utilizing oleoresinous vehicles. Among such oleoresinous vehicles are included drying oils such as linseed oil, china wood oil and the like. Further, the pigments of the invention may be incorporated alone or in addition to other pigments employed in paints and coating compositions, comprising chlorinated rubber or synthetic resin bases such as systems including polymers of vinyl acetate and/or other vinyl esters, polymers of acrylic or methacrylic acid or esters thereof, alkyd and alkyd-fortified oleoresinous systems, and esters of polyhydric alcohols with drying oil acids and other unsaturated carboxylic acids. The novel pigments of the invention are generally compatible with commonly used extender materials employed in paints and coating compositions, such as: diatomaceous silica, talcs and other forms of magnesium silicates, etc. The desired extender may be added to the reacted solution or to the hexavalent chrome solution prior to reaction with reducing agent. Or the extender material may be formulated with the already formed pigment of this invention (containing polymer additive) to form the desired coating system. The use of extender provides increased pigment volume, better suspension and consistency control, promoted adhesion to metal substrates and lower cost.

In order to more fully describe certain methods for practice of the invention, the following examples are given by way of illustration and are not to be construed as intended to limit the scope of the invention.

EXAMPLE I

In Table I are listed some preparations for chromium chromate pigments of this invention. An equivalent of 25 parts $CrO_3$ to 100 parts $H_2O$ (w/w) is used as the hexavalent chromium oxidant. The reductant to oxidant (calculated as $CrO_3$) mole ratio is given in column 3. The % hexavalent chrome in the reacted solution is given in Column 4. The reported analysis is based on reacted solution—approximately eight hours after "apparent" end of reaction—that is, when reactants have been completely added and gassing has ceased.

TABLE I

| Oxidant (Hexavalent Cr Compound) | Reductant | Ratio Oxidant: Reductant | % $Cr^{+6}$ Content |
|---|---|---|---|
| $CrO_3$ | $H_2O_2$ (30%) | 3:1 | 88 |
| $CrO_3$ | HCHO (37%) | 3:1 | 55.4 |
| $CrO_3$ | $CH_3OH$ | 3:1 | 65.6 |
| $CrO_3$ | furfural | 3:1 | 42.4 |
| $CrO_3$ | citric acid | 3:1 | 25 |
| $(NH_4)_2Cr_2O_7$ | HCHO (37%) | 3:1 | 80 |
| $CrO_3$ | $H_2O_2$ (30%) | 1:2 | 70 |

The reductant (in aqueous solution or dispersion) is carefully added to the oxidant $CrO_3$ solution, with the rate of addition controlled so that excessive rate of reaction is avoided. After the reaction has largely subsided, the reaction mix is transferred to evaporating trays for drying. The dried product is then ground to pigment particle size.

Since the extent of reduction of the hexavalent chrome depends not only upon the concentration of the reactants, but also on the specific reducing agent employed, or upon combination of reducing agents, pigments having a specific hexavalent to reduced chrome ratio can be obtained, or tailor made. Although corrosion inhibition properties obtain even with as much as 95% chrome reduced, most effective performance obtains when the hexavalent chrome content is in the 25–75% range or inversely the reduced chrome content is in the 75 to 25% range.

EXAMPLE II

Typical Pigment Preparation (Preparation of Item 6, Table II)

25 kg. of chromium trioxide are dissolved in 100 kg. of water. To this solution is added slowly and with vigorous stirring, a solution prepared by diluting 6.8 kg. (37% formalin) with 3 kg. water. The addition rate is controlled so that the reaction temperature does not exceed 95° C. When the reaction subsides, the reaction solution is permitted to cool down to room temperature. To this solution is then added slowly and with stirring 1 kg. of Acrysol A-1 (25% by weight polyacrylic acid solids). The obtained liquid is transferred to evaporating trays for drying, which is carried out at temperatures of about 110° C. After the product is visibly dry it is heated for another two hours at 150° C.

The dried product is then ground to pigment particle size, with maximum 1% coarse particles retained on #325 standard sieve.

EXAMPLE III

Effect of Temperature and Polymer Addition on Performance of Chromium Chromate Pigments A study was made on the effect of temperature of pigment drying and the effect of polymer addition on the performance of pigments described, made in accordance with this invention.

In Table II are listed the conditions of preparation of the pigments, and the performance in corrosion test and water soak test. The reference pigment was red lead.

Coating compositions were prepared in accordance with formulation in Table III. The pigments were formulated in aqueous based metal primer using Reichhold 40-422 Synthemul, a fast drying high molecular weight styrene-acrylic emulsion copolymer. All formulations had equivalent loading levels of pigment.

In these studies, cold rolled steel panels were solvent washed, cleaned, dried and then a primer coat was applied. The coat was allowed to dry for two hours and an aqueous industrial air dry topcoat was applied (Formulation Table IV). The panels were permitted to stand for a period of a week and then tested in accordance with the following procedures: The corrosion test involved longitudinally scratching of the surface of each panel followed by immersion of the panel in an aqueous solution containing 3% sodium chloride and 1% (by volume) of 30% hydrogen peroxide for a period of 15 hours. They were rated by observing the average failure (if any) of the paint film from the scribe. No failure gave excellent rating; 1/64" good plus rating; 1/32" good rating, 1/16" good minus; 3/32" fair.

The foregoing is a laboratory test extensively employed for quick evaluation of metal coatings.

Following standard procedure for the water immersion test specimens were suspended so that approximately ½ the specimen is immersed in distilled water. The bath temperature was 100° F.±2°. Exposure time 250 Hr. Ratings are based on blister condition in accordance with specification JAN-H-792. The characteristics of the blisters are assessed, namely by their size and frequency, and given a numerical rating. A numerical rating of 10 indicates no blisters. Any rating of 7.0 or lower is considered a serious blistering condition.

As is noted, improved corrosion protection is obtained with these pigments as compared to reference pigment. Heating the pigment at 450° F. and above seems to adversely affect corrosion inhibitive properties. However increasing the drying temperature of pigment and inclusion of polymeric constituents in pigment preparation both improve water soak performance.

TABLE II

Effect of Temperature and Polymer Addition on Performance "Chromium Chromate" Pigments

| | Oxidant[1] | Reductant | Oxidant: Reductant Mole Ratio | Polymer Addition[2] | Drying Temp. of Pigment | Corrosion Test | Water Soak |
|---|---|---|---|---|---|---|---|
| 1 | CrO$_3$ | HCHO (37%) | 3:1 | | 150° C. (300° F.) | Excellent | 8.5 |
| 2 | CrO$_3$ | HCHO (37%) | 3:1 | | 177° C. (350° F.) | Excellent | 9.0 |
| 3 | " | HCHO (37%) | 3:1 | | 204° C. (400° F.) | Good | 9.5 |
| 4 | " | HCHO (37%) | 3:1 | | 232° C. (450° F.) | Good minus - Fair | 9.5 |
| 5 | " | HCHO (37%) | 3:1 | | 240° C. (465° F.) | Fair | 9.0 |
| 6 | " | HCHO (37%) | 3:1 | .01 Polyacrylic acid | 150° C. | Excellent | 9.0 |
| 7 | " | HCHO (37%) | 3:1 | .025 Polyacrylic acid | 150° C. | Excellent | 9.5 |
| 8 | " | HCHO (37%) | 3:1 | .05 Polyacrylic acid | 150° C. | Excellent | 10 |
| 9 | " | HCHO (37%) | 3:1 | .20 Polyacrylic acid | 150° C. | Excellent | 10 |
| 10 | " | HCHO (37%) | 3:1 | .10 natrosol | 150° C. | Excellent | 10 |
| 11 | " | HCHO (37%) | 3:1 | .10 Polyvinyl alcohol | 150° C. | Excellent | 10 |
| 12 | " | Citric acid | 3:1 | .025 Polyacrylic acid | 150° C. | Excellent | 10 |
| Reference | | | | "Red Lead" Pigment | | Fair | 8.5 |

[1] 25% Sol. CrO$_3$ (w/w)
[2] w/w CrO$_3$

TABLE III

| Ingredients | Pounds | Gallons |
|---|---|---|
| Water Based Industrial Primer | | |
| Water | 100.0 | 12.00 |
| NH$_4$OH (28%) | 1.8 | 0.20 |
| Tamol 850[1] | 3.6 | 0.36 |
| Natrosol 250 MR.[2] | 1.3 | |
| Butoxyethoxy Propanol | 20.0 | 2.56 |
| PMA-18[3] | 0.2 | |
| Corrosion Inhibitive Pigment[4] | 22.6 | 0.80 |
| Red Oxide | 13.5 | 0.36 |
| Attagel 50[5] | 4.0 | 0.24 |
| Titanox CL-NC[6] | 6.3 | 0.18 |
| Disperse in Pebble Mill for 18 Hours | | |
| 40-422 Synthemul[7] | 724.0 | 83.8 |

[1] Rohm & Haas Co. (Sodium salt of polymeric carboxylic acid)
[2] Hercules Inc. (hydroxyethyl cellulose)
[3] Nuodex Div.-Tenneco Chem. (phenyl mercuric acetate)
[4] Item 6, Table II
[5] Pfizer Minerals, Pigments & Metals Div. (attapulgite clay)
[6] National Lead (Titanium dioxide)
[7] Reichhold Chemicals, Inc. (acrylic-styrene copolymer emulsion)

TABLE IV

| Ingredients | Pounds | Gallons |
|---|---|---|
| Aqueous Based Industrial Topcoat | | |
| Water | 10.5 | 12.6 |
| NH$_4$OH (28%) | 2.0 | .20 |
| Tamol 850 | 5.3 | 0.59 |
| Natrosol 250 M R | 1.1 | |
| Butoxyethoxy Propanol | 10.7 | 1.37 |
| PMA-18 | 0.2 | |
| Titanox CL-NC | 213.6 | 6.09 |
| | 337.9 | 20.85 |

TABLE IV-continued

| Ingredients | Pounds | Gallons |
| --- | --- | --- |
| Disperse in pebble mill for 18 hours | | |
| 40-422 Synthemul | 671.0 | 78.02 |
| Dibutyl Phthalate | 13.0 | 1.50 |
| | 1021.9 | 100.37 |

What is claimed:

1. The method of preparing a corrosion-inhibiting pigment which comprises reacting a hexavalent chromium compound in aqueous solution with a reducing agent under conditions effective to reduce 5 to 95% of the hexavalent chromium to lower valence state, dispersing in the reaction mixture containing at least about 20% chromium compounds by weight of said mixture, a water soluble or water dispersible polymeric film forming material; evaporating the resulting mixture to dryness at elevated temperature and pulverizing the dried product to pigment size range.

2. The method as defined in claim 1 wherein said hexavalent chromium compound is reacted under conditions effective to reduce 25 to 75% of the hexavalent chromium to lower valent state.

3. The method as defined in claim 1 or 2 wherein said hexavalent chromium compound is chromic acid.

4. The method as defined in claim 1 or 2 wherein the reducing agent is an oxidizable organic compound containing an active hydroxyl, aldehyde or carbonyl group.

5. The method as defined in claim 1 or 2 wherein said reducing agent is formaldehyde.

6. The method as defined in claim 1 or 2 wherein said reducing agent is hydrogen peroxide.

7. The method as defined in claim 1 or 2 wherein said polymeric material is selected from the group consisting of water-soluble and water dispersible polyacrylic acid compounds, polyvinyl alcohols and hydroxyethyl ethers of cellulose.

8. The method as defined in claim 1 or 2 wherein said polymeric material is a water-soluble or water-dispersible acrylic acid compound selected from the group consisting of polyacrylic acids, the alkali metal and ammonium salts thereof and aqueous emulsions of acrylic esters.

9. The method as defined in claim 1 wherein said polymeric material is added to the aqueous reaction mixture containing hexavalent and lower valent state chromium, in an amount at least of 0.01 parts by weight of chromium compounds in said reaction mixture determined as $CrO_3$.

10. The method as defined in claim 1 wherein said polymeric material is added to the aqueous reaction mixture containing hexavalent and lower valent state chromium, in an amount of at least 0.025 parts by weight of chromium compounds in said reaction mixture determined as $CrO_3$.

11. The method as defined in claim 9 or 10 wherein said evaporation to dryness is effected at a temperature below 500° F.

12. The method as defined in claim 1 wherein said evaporation to dryness is effected at a temperature below 500° F.

13. A corrosion-inhibiting pigment composition comprising as discrete particles chrome in hexavalent and partially reduced state enveloped in a polymeric film formed from at least one polymer selected from the group consisting of water soluble and water dispersible acrylic polymer compounds, polyacrylic acids, polyvinyl alcohols and hydroxy ethyl ethers of cellulose.

14. A corrosion-inhibiting pigment composition as defined in claim 13 wherein said chrome comprises 25 to 75% of unreduced hexavalent chromium compound and 75 to 25% of chromium compound in lower valent state.

15. A metal coating composition comprising as a vehicle a fast setting high molecular weight styrene-acrylic emulsion copolymer incorporating a chromium-chromate pigment as defined in claim 14.

* * * * *